(12) United States Patent
Torrent et al.

(10) Patent No.: US 10,926,474 B2
(45) Date of Patent: Feb. 23, 2021

(54) BUILD UNIT CONTROL

(71) Applicant: HEWLETT-PACKARD DEVELOPMENT COMPANY, L.P., Houston, TX (US)

(72) Inventors: Anna Torrent, Sant Cugat del Valles (ES); David Soriano Fosas, Sant Cugat del Valles (ES); Vicente Granados Asensio, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 176 days.

(21) Appl. No.: 16/075,228

(22) PCT Filed: Jan. 19, 2017

(86) PCT No.: PCT/US2017/014124
§ 371 (c)(1),
(2) Date: Aug. 3, 2018

(87) PCT Pub. No.: WO2018/136069
PCT Pub. Date: Jul. 26, 2018

(65) Prior Publication Data
US 2019/0039322 A1 Feb. 7, 2019

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/227* (2017.08); *B29C 64/245* (2017.08);
(Continued)

(58) Field of Classification Search
CPC ... B29C 64/393; B29C 64/295; B29C 64/245; B29C 64/227; G06F 30/20;
(Continued)

(56) References Cited

U.S. PATENT DOCUMENTS

| 8,017,055 B2 | 9/2011 | Davidson et al. |
| 8,185,229 B2 | 5/2012 | Davidson |

(Continued)

FOREIGN PATENT DOCUMENTS

| CN | 105383061 A | 3/2016 |
| EP | 2930008 A1 | 10/2015 |

(Continued)

OTHER PUBLICATIONS

"HP Launches Multi Jet Fusion 3D Printers", Retrieved from Internet: http://www.develop3d.com/hardware/hewlett-packard-HP-launches-multi-jet-fusion-3d-printers, May 17, 2016, 12 pages.

*Primary Examiner* — Charles R Kasenge
(74) *Attorney, Agent, or Firm* — HP Inc. Patent Department

(57) ABSTRACT

Certain examples described herein relate to build units that are physically connectable to at least one host apparatus of an additive manufacturing system. A build unit comprises at least one controllable device useable in an object building operation. In certain examples, the at least one device is controllable according to first control instructions originating from the at least one host apparatus when the build unit is physically connected to the at least one host apparatus. In certain examples, the at least one device is also controllable according to second control instructions generated independently of the at least one host apparatus when the build unit is not physically connected to the at least one host apparatus.

18 Claims, 5 Drawing Sheets

(51) Int. Cl.
  *G06F 17/50* (2006.01)
  *B33Y 40/00* (2020.01)
  *B29C 64/227* (2017.01)
  *B29C 64/245* (2017.01)
  *B29C 64/295* (2017.01)
  *B33Y 30/00* (2015.01)
  *G06F 30/20* (2020.01)
  *G05B 19/042* (2006.01)
  *G06F 119/18* (2020.01)

(52) U.S. Cl.
  CPC ............ *B29C 64/295* (2017.08); *B33Y 30/00* (2014.12); *B33Y 40/00* (2014.12); *B33Y 50/02* (2014.12); *G06F 30/20* (2020.01); *G05B 19/042* (2013.01); *G06F 2119/18* (2020.01)

(58) Field of Classification Search
  CPC ..... G06F 2119/18; B33Y 40/00; B33Y 50/02; B33Y 30/00; G05B 19/042
  See application file for complete search history.

(56) References Cited

U.S. PATENT DOCUMENTS

| | | | | |
|---|---|---|---|---|
| 9,418,503 | B2* | 8/2016 | Williams | G07F 17/26 |
| 2003/0171905 | A1* | 9/2003 | Wagner | G05B 17/02 |
| | | | | 703/13 |
| 2008/0100710 | A1* | 5/2008 | Masumoto | H04N 1/00307 |
| | | | | 348/207.2 |
| 2009/0086240 | A1* | 4/2009 | Kim | G03D 15/005 |
| | | | | 358/1.13 |
| 2012/0224755 | A1* | 9/2012 | Wu | B29C 64/386 |
| | | | | 382/131 |
| 2013/0108726 | A1* | 5/2013 | Uckelmann | B33Y 50/02 |
| | | | | 425/174.4 |
| 2014/0025190 | A1* | 1/2014 | Wu | B29C 64/386 |
| | | | | 700/119 |
| 2014/0288699 | A1* | 9/2014 | Williams | B29C 64/379 |
| | | | | 700/233 |
| 2014/0330418 | A1* | 11/2014 | Wu | G06F 30/00 |
| | | | | 700/98 |
| 2014/0330421 | A1* | 11/2014 | Wu | B33Y 50/00 |
| | | | | 700/119 |
| 2015/0084956 | A1* | 3/2015 | Wu | G06T 17/00 |
| | | | | 345/424 |
| 2015/0088291 | A1* | 3/2015 | Wu | B33Y 50/00 |
| | | | | 700/119 |
| 2015/0145158 | A1* | 5/2015 | Levine | B29C 64/393 |
| | | | | 264/308 |
| 2015/0145910 | A1 | 5/2015 | Libinson | |
| 2016/0004490 | A1* | 1/2016 | Nagatani | H04L 67/36 |
| | | | | 358/1.15 |
| 2016/0016362 | A1* | 1/2016 | Kim | H04W 4/80 |
| | | | | 700/98 |
| 2016/0042255 | A1* | 2/2016 | Ganesh | G06Q 30/0241 |
| | | | | 358/1.15 |
| 2016/0067926 | A1* | 3/2016 | Andrews | G05B 15/02 |
| | | | | 700/98 |
| 2016/0107392 | A1* | 4/2016 | Lubin | B33Y 99/00 |
| | | | | 700/98 |
| 2016/0133049 | A1* | 5/2016 | Hill | G06T 17/10 |
| | | | | 700/98 |
| 2016/0207257 | A9* | 7/2016 | Wu | G06F 30/00 |
| 2016/0210779 | A9* | 7/2016 | Wu | G06T 19/20 |
| 2016/0271881 | A1 | 9/2016 | Bostick et al. | |
| 2016/0297149 | A1* | 10/2016 | Albert | B29C 64/393 |
| 2016/0318255 | A1* | 11/2016 | Ou | G05B 19/4099 |
| 2017/0279783 | A1* | 9/2017 | Milazzo | H04L 63/061 |
| 2018/0099460 | A1* | 4/2018 | Iverson | B29C 64/386 |
| 2019/0026945 | A1* | 1/2019 | Demirli | G06F 3/011 |
| 2019/0129484 | A1* | 5/2019 | Liarte | G06F 1/263 |
| 2019/0339671 | A1* | 11/2019 | Yona | G05B 19/4099 |

FOREIGN PATENT DOCUMENTS

| | | |
|---|---|---|
| WO | 2015117054 A1 | 8/2015 |
| WO | 2016050311 A1 | 4/2016 |
| WO | 2016116139 A1 | 7/2016 |
| WO | 2016131785 A1 | 8/2016 |

* cited by examiner

BUILD UNIT CONTROL

BACKGROUND

Additive manufacturing systems, commonly referred to as "3D printers", have been proposed as a potentially convenient way to produce three-dimensional objects. Additive manufacturing systems typically receive or generate a digital model of the three-dimensional object to be built. The digital model is processed in order to instruct the 3D printer to produce the object using one or more build materials, for example on a layer-by-layer basis. These build materials may comprise a combination of agents and powdered substrates, heated polymers and/or liquid solutions of build material. Build materials may be stored in a build unit and provided to the 3D printer prior to and/or during a manufacturing operation.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
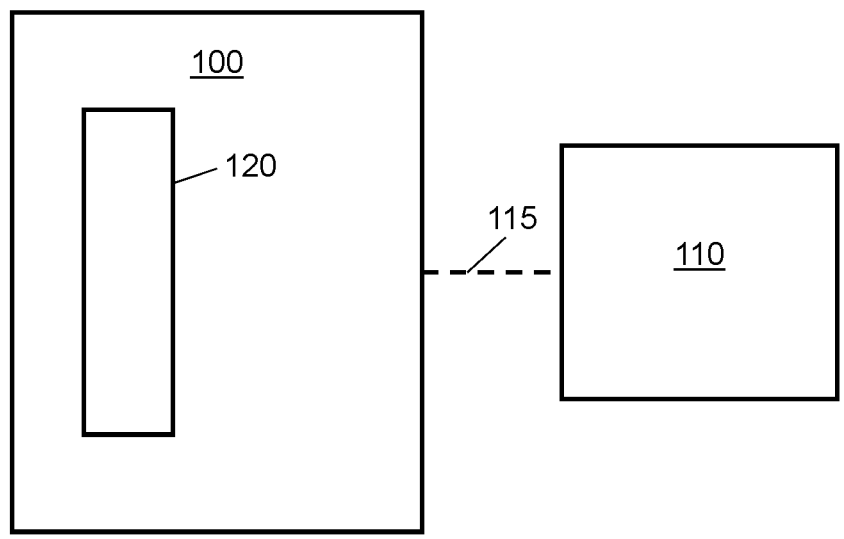
FIG. 1 is a schematic illustration showing a build unit according to an example.

FIG. 1 shows a build unit 100 according to an example. The build unit 100 may be used in additive manufacturing operations, commonly known as 3D printing, to manufacture 3D objects. In some examples, each layer of a 3D object is generated by solidifying portions of one or more successive layers of build material. In an example, the build material is powder-based. The properties of manufactured objects may be dependent on the type of build material used in a given additive manufacturing operation. In some examples, solidification of a powder material is enabled by applying a fusing agent and/or an application of energy to the build material. Other examples of build materials include, but are not limited to, liquids, slurries and pastes.

The build unit 100 may be used to store build material and object layers during and after an additive manufacturing operation. For example, the build unit 100 may comprise a build platform to support an object to be built. In some examples, the build unit 100 comprises a build material storage compartment to store build material for use in additive manufacturing operations. The build unit 100 may comprise further components, some of which are described below, and some of which are omitted in the present description for ease of explanation.

The build unit 100 is physically connectable to at least one host apparatus 110 of an additive manufacturing system. The build unit 100 and the at least one host apparatus 110 are arranged such that the build unit 100 may be connected to, and removed from, the at least one host apparatus 110. In an example, the build unit 100 includes a receiving structure to receive the at least one host apparatus 110. In another example, a given host apparatus includes a receiving structure in which the build unit 100 may be fitted.

The build unit 100 and the at least one host apparatus 110 are connectable via at least one physical connection 115. An example of a physical connection is an electrical cable. In one example, the build unit 100 and a given host apparatus are connectable via a plurality of physical connections. For example, a first electrical connection between the build unit 100 and the given host apparatus may provide power to the build unit 100, and a second electrical connection between the build unit 100 and the given host apparatus may enable data to be communicated between the build unit 100 and the host apparatus.

In some examples, the build unit 100 is connectable to a plurality of host apparatuses, for example different types of host apparatuses or similar types of host apparatuses. An example of a type of host apparatus is an additive manufacturing system, such as a 3D printer. Another example of a type of host apparatus is a personal computer, PC. A further example of a type of host apparatus is a post-processing apparatus for processing a 3D object after the 3D object has been built. Such a post-processing apparatus may perform operations such as cooling a built object and separating a built object from non-solidified powder residue. In one example, the build unit 100 is connected to an additive manufacturing apparatus for additive manufacturing and, after the additive manufacturing operation is completed, is moved and connected to a post-processing apparatus.

A further example of a type of host apparatus is a pre-processing apparatus, such as a build material fill apparatus to add build material to the build unit 100. The build unit 100 may be connected to such a pre-processing apparatus to fill the build unit 100 with build material before the build unit 100 is connected to an additive manufacturing apparatus for manufacturing a new object. In some examples, a single host apparatus performs additive manufacturing and at least one of post-processing and pre-processing.

The build unit 100 comprises at least one controllable device 120. The at least one controllable device 120 is useable in an object building operation. In some examples, the at least one controllable device 120 is useable in additive manufacturing, post-processing and/or pre-processing operations. An example of a controllable device is a drive unit for moving a build platform of the build unit 100. Another example of a controllable device is a heater for heating build material in the build unit 100.

In some examples, the at least one device is controllable according to a Controller Area Network, CAN, protocol, it being understood that other protocols may be used to control the at least one device in other examples.

The at least one device 120 is controllable according to first control instructions originating from the at least one host apparatus 110 when the build unit 100 is physically connected to the at least one host apparatus 110. The at least one host apparatus 110 can control the at least one device 120 of the build unit 100 when a connection between the build unit 100 and the at least one host apparatus 110 is in place. The build unit 100 and/or the controllable device(s) included therein may thereby be operated as slave modules from the at least one host apparatus 110.

The at least one device 120 is also controllable according to second control instructions. The second control instructions are generated independently of the at least one host apparatus 110 when the build unit 100 is not physically connected to the at least one host apparatus 110.

In an example, the second control instructions are generated in the build unit 100. In some examples, the build unit 100 comprises a user interface arranged to receive user input, for example a display and/or one or more buttons. In an example, the display comprises a touch-sensitive display. The second control instructions may be generated at least in part in response to user input received via the user interface. A user may control the at least one device 120 of the build unit 100 when the build unit 100 is not connected to a host apparatus. In other words, the build unit 100 may be operated as a standalone module without a separate host apparatus being connected thereto.

Figure 2A:
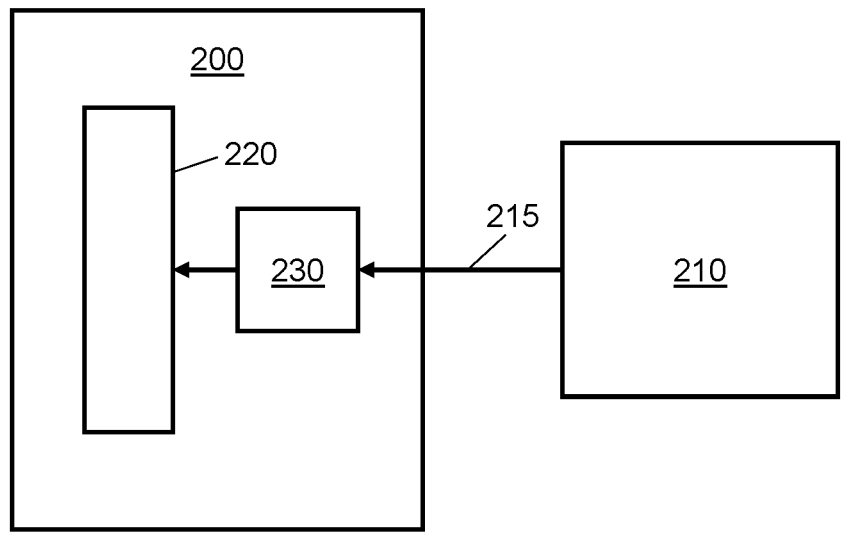
FIG. 2A is a schematic illustration showing a build unit in a first configuration according to an example.
Figure 2B:
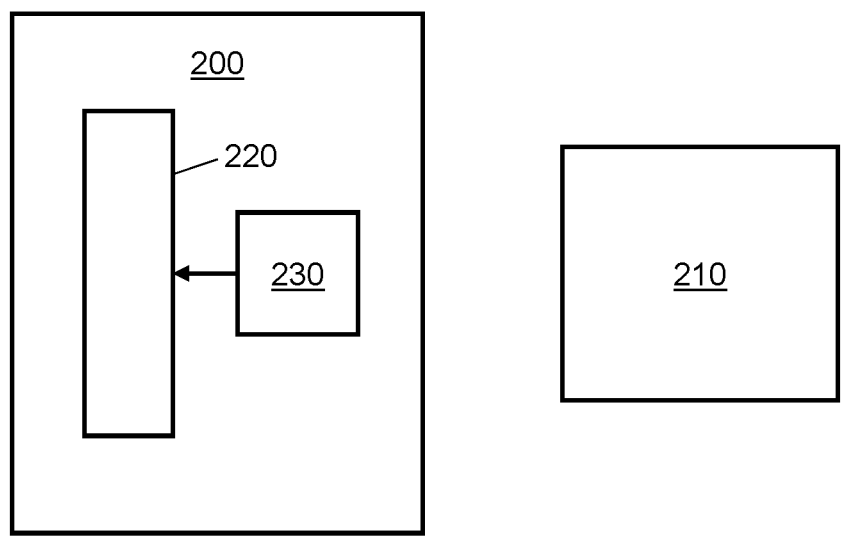
FIG. 2B is a schematic illustration showing a build unit in a second configuration according to an example.

FIGS. 2A and 2B show a build unit 200 in a first and a second configuration, respectively, according to an example. Some items depicted in FIGS. 2A and 2B are similar to items shown in FIG. 1. Corresponding reference signs, incremented by 100, are therefore used for similar items.

The build unit 200 is physically connectable to a host apparatus 210 of an additive manufacturing system. In an example, the build unit 200 is mechanically connectable to the host apparatus 210. In another example, the build unit 200 is electrically connectable to the host apparatus 210. The build unit 200 comprises at least one controllable device 220 useable in an object building operation. The at least one device 220 is controllable according to first control instructions originating from the host apparatus 210 and second control instructions generated independently of the host apparatus 210.

The build unit 200 also comprises a control circuit 230. The control circuit 230 controls the at least one device 220 according to either a first operating mode or a second, different operating mode.

In the example shown in FIG. 2A, the build unit 200 is physically connected to the host apparatus 210 by at least one physical connection 215, for example an electrical connection. In the present example, the control circuit 230 controls the at least one device 220 according to the first operating mode. The first operating mode comprises the control circuit 230 controlling the at least one device 220 according to first control instructions. The first control instructions originate and are received from the host apparatus 210. In an example, the control circuit 230 passes the first control instructions from the host apparatus 210 to the at least one device 220 to control the at least one device 220. In another example, the control circuit 230 receives the first control instructions from the host apparatus 210, generates further control instructions based at least in part on the first control instructions, and controls the at least one device 220 using the further control instructions.

In the example shown in FIG. 2B, the build unit 200 is not physically connected to the host apparatus 210. In the present example, the control circuit 230 controls the at least one device 220 according to the second operating mode. The second operating mode comprises the control circuit 230 generating second control instructions and controlling the at least one device 220 according to the generated second control instructions. The second control instructions are generated independently of the host apparatus 210.

In some examples, the build unit 200 comprises a detector (not shown). Examples of detectors include, but are not limited to, sensors and switches. The detector is configured to determine whether the build unit 200 is physically connected to the host apparatus 210. In an example, the control circuit 230 controls the at least one device 220 according to the first operating mode when the detector determines that the build unit 200 is physically connected to the host apparatus 210. In an example, the control circuit 230 controls the at least one device 220 according to the second operating mode when the detector determines that the build unit 200 is not physically connected to the host apparatus 210.

In some examples, the build unit 200 and the host apparatus 210 are communicatively coupled via a non-physical connection. For example, the connection between the build unit 200 and the host apparatus 210 may be a wireless connection (not shown). In one such example, the control circuit 230 controls the at least one device 220 according to the first operating mode. In another such example, the control circuit 230 controls the at least one device 220 according to the second operating mode.

In some examples, for example when the build unit 200 is connected to the host apparatus 210, first control instructions are received from the host apparatus 210 and additionally second control instructions are generated independently of the host apparatus 210. In one such example, the first control instructions take precedence over the second control instructions in controlling the at least one device 220. In another such example, the second control instructions take precedence over the first control instructions in controlling the at least one device 220. In an example, either the first operating mode or the second operating mode is configured as a 'preferred' operating mode. In an example, either the first operating mode or the second operating mode is configured as a 'default' operating mode.

Figure 3A:
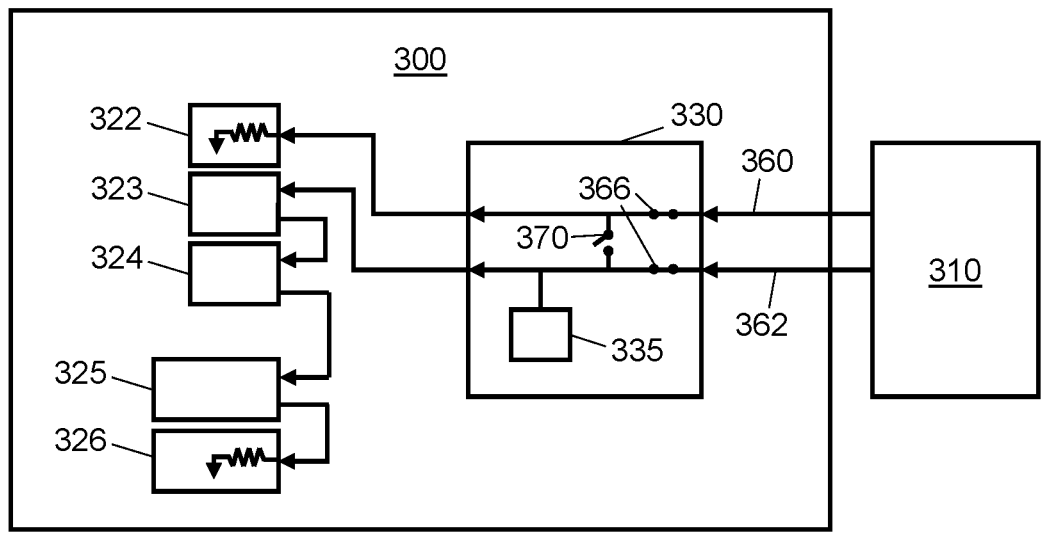
FIG. 3A is a schematic illustration showing a build unit in a first configuration according to an example.
Figure 3B:
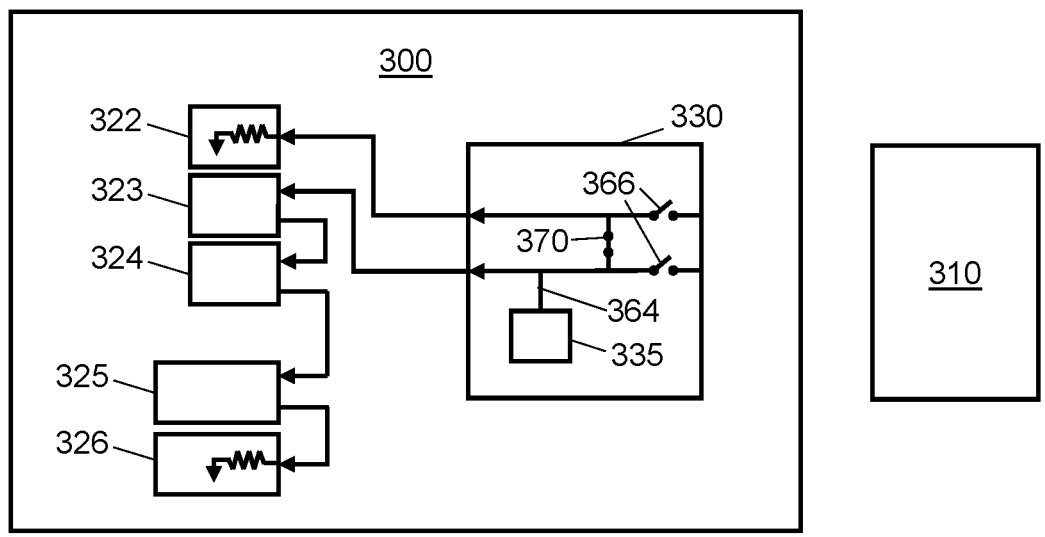
FIG. 3B is a schematic illustration showing a build unit in a second configuration according to an example.

FIGS. 3A and 3B show a build unit 300 in a first and a second configuration, respectively, according to an example. Some items depicted in FIGS. 3A and 3B are similar to items shown in FIGS. 2A and 2B. Corresponding reference signs, incremented by 100, are therefore used for similar items.

In the present example, the build unit 300 comprises a plurality of circuit boards 322, 323, 324, 325, 326. Each of the circuit boards 322, 323, 324, 325, 326 may correspond to or be otherwise associated with a controllable device of the build unit 300. In the present example, the circuit boards 322, 323 and 324 are mechatronic boards arranged to control a drive unit for moving a build platform. For example, each of mechatronic boards 322, 323 and 324 may control a respective motor of the drive unit to move the build platform according to a different axis of motion. Each of mechatronic boards 322, 323 and 324 may comprise a microprocessor and/or at least one servo-mechanism (not shown).

In the present example, the circuit boards 325 and 326 are heating boards arranged to control at least one heater of the build unit 300. Each of heating boards 325 and 326 may comprise two microprocessors (not shown).

The build unit 300 comprises a control circuit 330. The control circuit 330 comprises a microprocessor 335.

In the present example, the control circuit 330 and the plurality of circuit boards 322, 323, 324, 325, 326 are configured to operate according to a Controller Area Network (CAN) bus protocol. CAN is a message-based communication standard. In accordance with the CAN bus standard, a given CAN bus line has two terminations.

In the example shown in FIG. 3A, the build unit 300 is connected to a host apparatus 310, for example a 3D printer or a PC. The microprocessor 335 of the control circuit 330 detects the presence of the connected host apparatus 310. Based on the detection of the connected host apparatus 310, the microprocessor 335 configures the control circuit 330 to operate according to a first operating mode. The first operating mode may be referred to as a 'slave' mode. In the first operating mode, the control circuit 330 closes switches 366 and opens switch 370. As such, control instructions originating from the host apparatus 310 are passed to one or more of the circuit boards 322, 323, 324, 325, 326.

In the first operating mode, two CAN bus lines 360, 362 enable communication between the host apparatus 310 and the build unit 300. CAN bus line 360 and CAN bus line 362 each have two terminations. The first termination for each of CAN bus line 360 and CAN bus line 362 is in the host apparatus 310. The second termination for CAN bus line 360 is in circuit board 322. The second termination for CAN bus line 362 is in circuit board 326. As such, the build unit 300 complies with the CAN bus protocol when in the first operating mode, in that each CAN bus line has two terminations.

In the example shown in FIG. 3B, the build unit 300 is not connected to the host apparatus 310. The microprocessor 335 of the control circuit 330 detects an absence of a connected host apparatus. Based on the detection of such an absence, the microprocessor 335 configures the control circuit 330 to operate according to a second operating mode. The second operating mode may be referred to as a 'stand-alone' or 'master' mode. In the second operating mode, the control circuit 330 opens switches 366 and closes switch 370. As such, control instructions generated by the microprocessor 335 of the control circuit 330 may be transmitted to the circuit boards 322, 323, 324, 325, 326.

In the second operating mode, a single CAN bus line 364 replaces the two CAN bus lines 360, 362 that are used in the first operating mode. CAN bus line 364 enables the microprocessor 335 of the control circuit 330 to communicate with and/or control the plurality of circuit boards 322, 323, 324, 325, 326 when the control circuit 330 is operating in the second operating mode. CAN bus line 364 has two terminations. The first termination of CAN bus line 364 is in circuit board 322 and the second termination of CAN bus line 364 is in circuit board 326. As such, the build unit 300 also complies with the CAN bus protocol when in the second operating mode.

Figure 4:
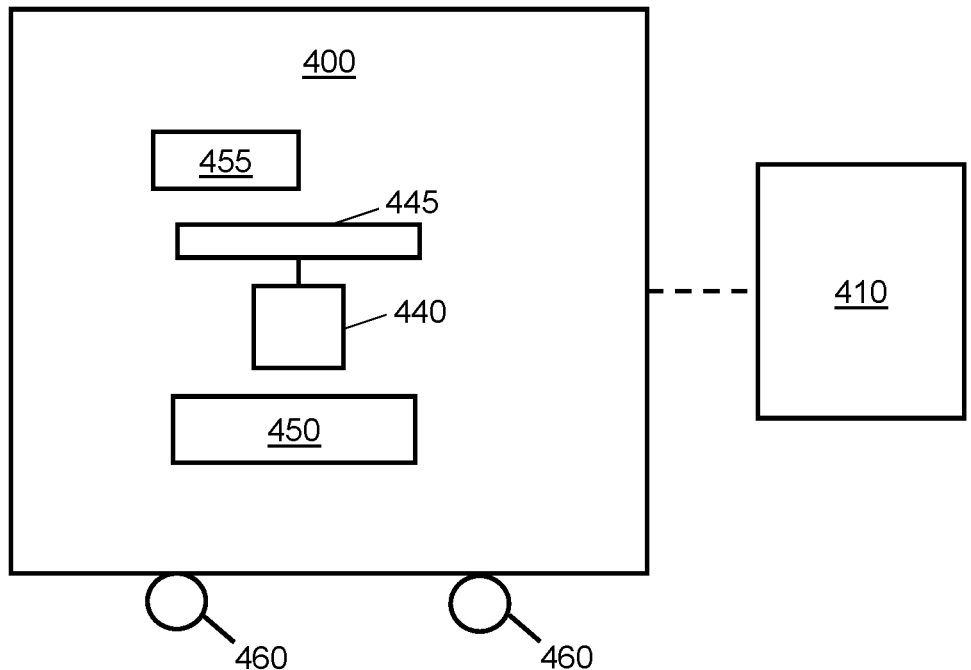
FIG. 4 is a schematic illustration showing a build unit according to an example.

FIG. 4 shows a build unit 400 according to an example. Some items depicted in FIG. 4 are similar to items shown in FIG. 1. Corresponding reference signs, incremented by 300, are therefore used for similar items.

The build unit 400 is removably connectable to a host apparatus 410 of an additive manufacturing system. The build unit 400 is arranged to contain a 3D object to be built. For example, the build unit 400 may comprise a build volume in which to house the 3D object during and/or after a build operation. The 3D object to be built and/or the build material to be used to build the 3D object may be supported during and/or after building by a moveable build platform 445. The build platform 445 may comprise a hardened planar surface that facilitates building of successive stacked layers.

The build unit 400 comprises a plurality of controllable devices. The plurality of controllable devices are controllable according to first control instructions originating from the host apparatus 410, for example when the build unit 400 is connected to the host apparatus 410, and second control instructions generated independently of the host apparatus 410, for example when the build unit 400 is not connected to the host apparatus 410.

The plurality of controllable devices includes a drive unit 440 to move the build platform 445. In some examples, the drive unit 440 includes at least one drive motor. In an example, the drive unit 440 includes one or more at least partly pneumatic or hydraulic mechanisms to move the build platform 445. In further examples, the drive unit 440 includes one or more transmission elements such as gears, pistons, linear motors, stepper motors and servo-mechanisms to raise and lower the build platform 445. In some examples, during an additive manufacturing operation, the drive unit 440 maintains the build platform 445 at a desired height, for example at a given distance from an agent distributor or energy source of a 3D printer. In an example, during an additive manufacturing operation, the drive unit 440 displaces the build platform 445 downwards after each successive layer has been processed and/or built.

The drive unit 440 is controllable according to the first control instructions and the second control instructions. As such, the build platform 445 may be moved in the absence of a host apparatus as well as when the build unit 400 is connected to host apparatus 410.

The build unit 400 comprises a build material storage compartment 450 to store build material for use in build operations. In some examples, build material storage compartment 450 comprises a bucket. In some examples, during an additive manufacturing operation, build material is transported from the build material storage compartment 450 to the build platform 445, for example by a transport module (not shown). In the present example, the build material storage compartment 450 is arranged such that access to the build material storage compartment 450 is enabled by moving the build platform 445. For example, the build material storage compartment 450 may be arranged beneath the build platform 445. As such, the build material storage compartment 450 may be accessed by raising the build platform 445. The build material storage compartment 450 may be accessed in order to add and/or remove build material.

In an example, the plurality of controllable devices includes at least one heater 455. The at least one heater 455 heats build material in the build unit 400. The at least one heater 455 may be disposed on the build platform 445, in the build material storage compartment 450, or elsewhere in the build unit 400. The at least one heater 455 may be arranged to pre-heat build material before solidification of the build material. In one example, the at least one heater 455 is activated when a sensed temperature, for example in the build volume and/or the build material storage compartment 450, is below a predetermined threshold.

The at least one heater 455 is controllable according to the first control instructions and the second control instructions. As such, the at least one heater 455 may be operated in the absence of a host apparatus as well as when the build unit 400 is connected to the host apparatus 410.

The build unit 400 comprises wheels 460 to enable the build unit 400 to be transported between different host apparatuses of the additive manufacturing system. The build unit 400 may be disconnected from a first host apparatus, for example a 3D printer, and moved to and connected to a second host apparatus, for example a post-processing station. In some examples, the different host apparatuses are stationary. In other examples, the build unit 400 is stationary and the different host apparatuses to which the build unit 400 is connectable are each transported to the build unit 400.

Figure 5:
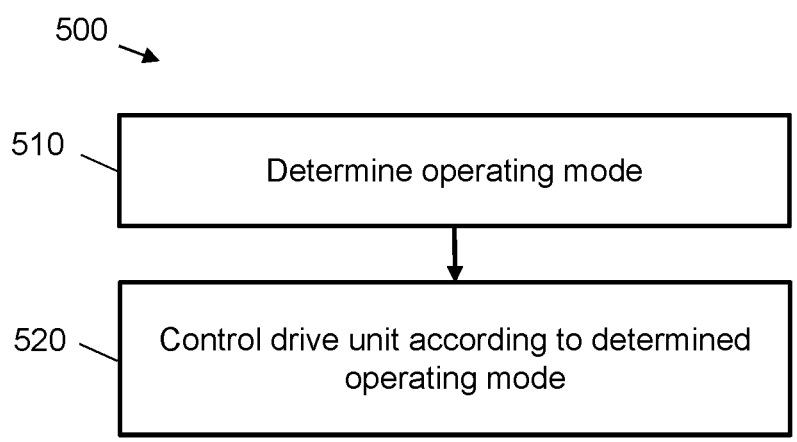
FIG. 5 is a flow diagram showing a method of operating a build unit according to an example.

FIG. 5 shows a method 500 of operating a build unit for an additive manufacturing system according to an example. The build unit may comprise one of the build units 100, 200, 300 and 400 as previously described. The build unit comprises a moveable platform to support an object to be built. The build unit also comprises a drive unit to move the platform. The build unit is removably connectable to at least one external device, for example a 3D printer and/or a PC. The method 500 may be performed by a control circuit such as control circuit 230, 330 as previously described.

At item 510, it is determined whether to control the drive unit according to a first operating mode or a second, different operating mode.

The first operating mode comprises controlling the drive unit according to first control instructions received from the at least one external device. The first control instructions may, for example, be received from the at least one external device when the build unit is connected to the at least one external device.

The second operating mode comprises controlling the drive unit according to second control instructions generated independently of the at least one external device. The second control instructions may, for example, be generated in the build unit when the build unit is not connected to the at least one external device.

In some examples, the second operating mode comprises generating the second control instructions at least in part in response to user input received via a user interface of the build unit.

In some examples, it is determined whether the build unit is physically connected to the at least one external device. In such examples, the operating mode for controlling the drive unit is determined based at least in part on the determination of whether the build unit is connected to the at least one external device.

At item 520, the drive unit is controlled according to the operating mode determined at item 510. In some examples, the drive unit is controlled according to the first operating mode in response to a determination that the build unit is connected to the at least one external device. In some examples, the drive unit is controlled according to the second operating mode in response to a determination that the build unit is not connected to the at least one external device.

In an example, at least one heater of the build unit is also controlled according to the operating mode determined at item 510.

In some examples, the drive unit is controlled according to the second operating mode in order to move the platform such that access to a build material compartment is enabled.

Figure 6:
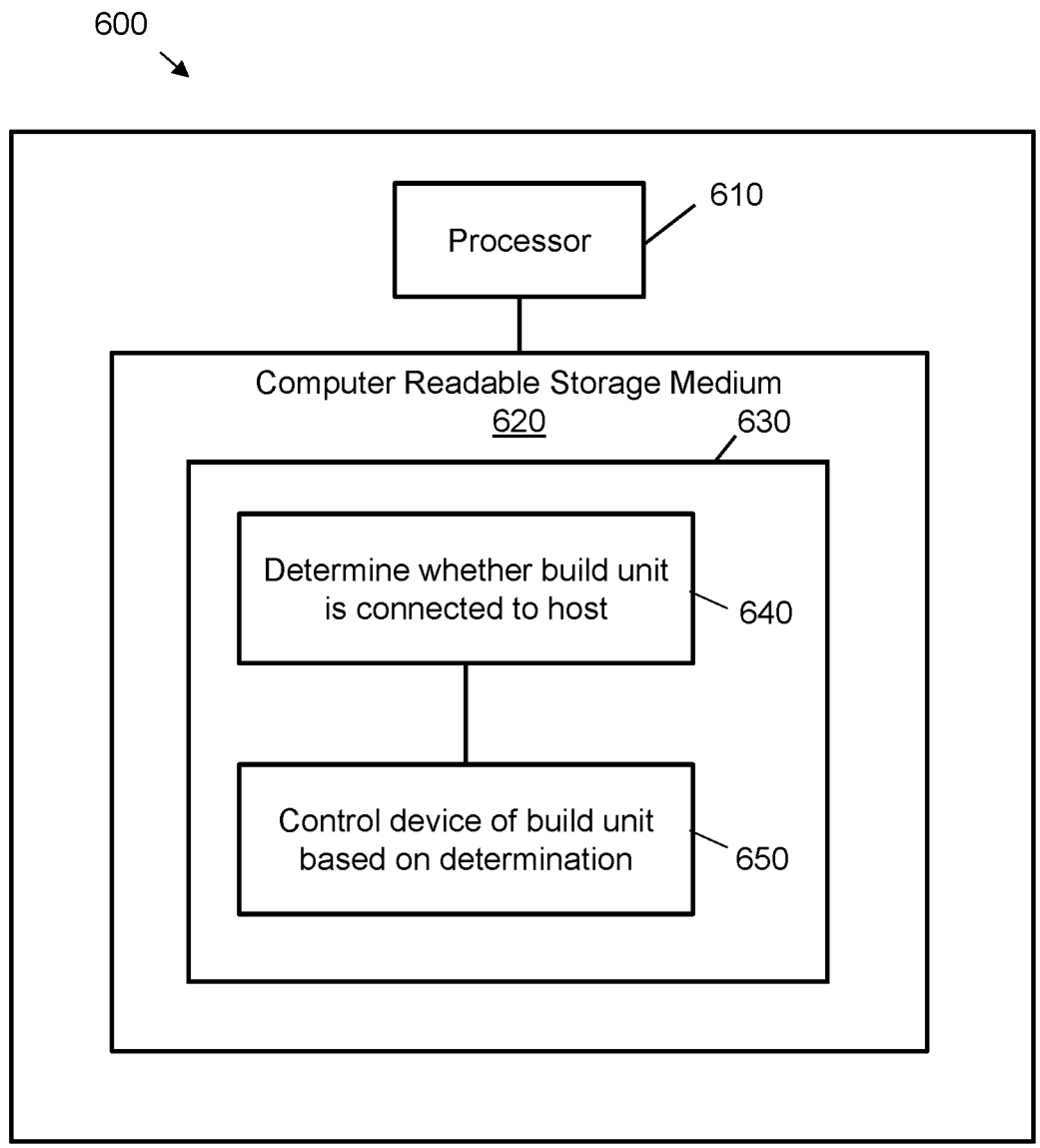
FIG. 6 is a schematic illustration showing a processor and a computer readable storage medium with instructions stored thereon according to an example.

FIG. 6 shows example components of a build unit 600 of an additive manufacturing system. The build unit 600 may be arranged to implement certain examples described herein. The build unit 600 comprises at least one controllable device (not shown). In some examples, the build unit 600 may correspond to the build unit 100 as depicted in FIG. 1 and described above. A processor 610 (or processors) of the build unit 600 is connectably coupled to a computer-readable storage medium 620 comprising a set of computer-readable instructions 630 stored thereon, which may be executed by the processor 610.

Instruction 640 instructs the processor to determine whether the build unit 600 is physically connected to at least one host apparatus.

Instruction 650 instructs the processor to control the at least one device according to either first control instructions or second control instructions, based at least in part on the determination of whether the build unit 600 is physically connected to the at least one host apparatus. The first control instructions are received from the at least one host apparatus when the build unit 600 is physically connected to the at least one host apparatus. The second control instructions are generated in the build unit 600, for example by processor 610, when the build unit 600 is not physically connected to the at least one host apparatus. In an example, the second control instructions are generated at least in part in response to user input received via a user interface of the build unit.

Processor 610 can include a microprocessor, microcontroller, processor module or subsystem, programmable integrated circuit, programmable gate array, or another control or computing device. The computer-readable storage medium 620 can be implemented as one or multiple computer-readable storage media. The computer-readable storage medium 620 may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 630 can be stored on one computer-readable storage medium, or alternatively, can be stored on multiple computer-readable storage media. The computer-readable storage medium 620 or media can be located either in the build unit 600 or located at a remote site from which computer-readable instructions can be downloaded over a network for execution by the processor 610.

Certain examples provide a build unit for an additive manufacturing with an increased level of functionality. By enabling devices of the build unit to be controlled not only according to first control instructions originating from a connected host apparatus, but also according to second control instructions generated independently of a host apparatus, the build unit may be operated in an independent, 'standalone', mode as well as in an externally driven, 'slave', mode.

Certain examples enable a build unit to be operated in the absence of a 3D printer or other host apparatus. For example, the build unit may be operated as a standalone module, controllable independently of any host apparatus. As such, a user may interact with and/or control the functions of the build unit directly, without establishing a connection between the build unit and a host.

Certain examples enable a build unit to be operated using relatively few external connections. For example, the build unit may be operated with only a connection to a power source, and not an additional connection to a host apparatus. The build unit can be operated in the absence of a host apparatus, for example when positioned in physical locations where no host apparatus is present and/or available. The build unit therefore has increased flexibility and functionality.

Certain examples provide an efficient use of space and/or resources, for example within a build unit. In certain examples, a control circuit of a build unit can operate according to both a first and a second operating mode. In the first operating mode, the control circuit controls a device according to first control instructions received from an external host apparatus. In the second operating mode, the control circuit generates second control instructions independently of the host apparatus and controls the device according to the generated second control instructions. As such, the control circuit may operate as both a "slave" and a "master" controller, depending on the operating mode in which the control circuit is configured to operate. By configuring a control circuit to switch between different operating modes, efficient use of resources and/or space within the build unit is increased compared with a case in which each operating mode has a different dedicated control circuit.

Certain examples improve user access to a build material storage compartment of a build unit. By enabling a drive unit of a build platform to be controlled in the absence of a connected host apparatus, for example via control instructions generated independently of the host apparatus, the build platform may be moved such that access to the build material storage compartment is enabled when the build unit is not connected to any host apparatus. As such, a user can add and/or remove build material from the build material storage compartment even when the build unit is not connected to a host apparatus.

The preceding description has been presented to illustrate and describe examples of the principles described. This description is not intended to be exhaustive or to limit these principles to any precise form disclosed. Many modifications and variations are possible in light of the above teaching.

What is claimed is:

1. A build unit physically connectable to a host apparatus for an additive manufacturing system, the build unit comprising:
   a controllable device useable in an object building operation;
   a detector to determine whether the build unit is physically connected to the host apparatus; and
   a control circuit comprising a first switch, a second switch, and a processor, the control circuit to:
     in response to the detector determining that the build unit is physically connected to the host apparatus, control the controllable device according to a first operating mode in which the controllable device is controlled according to first control instructions originating from the host apparatus, and
     in response to the detector determining that the build unit is not physically connected to the host apparatus, control the controllable device according to a second operating mode in which the controllable device is controlled according to second control instructions generated independently of the host apparatus when the build unit is not physically connected to the host apparatus,
   wherein the first switch when closed in the first operating mode allows communication of the first control instructions from the host apparatus to the controllable device, and
   wherein the second switch when closed in the second operating mode allows communication of the second control instructions from the processor to the controllable device.

2. The build unit of claim 1, wherein the second control instructions are generated in the build unit.

3. The build unit of claim 1, comprising a user interface, wherein the second control instructions are responsive to a user input received via the user interface.

4. The build unit of claim 1, comprising a moveable build platform to support an object to be built,
   wherein the controllable device comprises a drive unit to move the build platform, and
   wherein the drive unit is controllable according to the first control instructions or the second control instructions.

5. The build unit of claim 4, comprising a build material storage compartment to store a build material,
   wherein access to the build material storage compartment is enabled by moving the build platform.

6. The build unit of claim 1, wherein the controllable device comprises a heater to heat a build material in the build unit, and
   wherein the heater is controllable according to the first control instructions or the second control instructions.

7. The build unit of claim 1, wherein the controllable device is controllable according to a Controller Area Network (CAN) protocol.

8. The build unit of claim 1, wherein the build unit being physically connected to the host apparatus comprises the build unit being electrically connected to the host apparatus.

9. The build unit of claim 1, wherein the processor is to provide the second control instructions in the second operating mode.

10. The build unit of claim 1, wherein, in the first operating mode, the control circuit is to select the first control instructions from among the first control instructions and the second control instructions according to a precedence setting specifying that the first operating mode has precedence over the second operating mode.

11. A method of operating a build unit for an additive manufacturing system, the build unit being removably connectable to an external device and comprising a moveable platform to support an object to be built, and a drive unit to move the platform, the method comprising:
   determining whether the build unit is physically connected to the external device;
   controlling the drive unit according to a first operating mode in response to a determination that the build unit is physically connected to the external device, wherein the first operating mode comprises controlling the drive unit according to first control instructions received at the drive unit from the external device when a first switch is closed in the first operating mode; and
   controlling the drive unit according to a second operating mode in response to a determination that the build unit is not physically connected to the external device, wherein the second operating mode comprises controlling the drive unit according to second control instructions generated independently of the external device when the build unit is not physically connected to the external device, wherein the second control instructions are received at the drive unit from a processor in the build unit when a second switch is closed in the second operating mode.

12. The method of claim 11, wherein in the second operating mode the second control instructions are generated in response to a user input received via a user interface of the build unit.

13. The method of claim 11, comprising controlling a heater of the build unit according to the first control instructions or the second control instructions.

14. The method of claim 11, wherein the determining is based on an output of a sensor in the build unit.

15. The method of claim 11, comprising:

in the first operating mode, selecting, by a control circuit, the first control instructions from among the first control instructions and the second control instructions according to a precedence setting specifying that the first operating mode has precedence over the second operating mode.

16. A non-transitory computer-readable storage medium comprising instructions that when executed cause a processor in a build unit to:

determine whether the build unit for an additive manufacturing system is physically connected to a host apparatus, the build unit comprising a controllable device;

in response determining that the build unit is physically connected to the host apparatus, control the controllable device according to a first operating mode in which the controllable device is controlled according to first control instructions received from the host apparatus based on a first switch of a control circuit in the build unit being closed in the first operating mode to allow communication of the first control instructions from the host apparatus to the controllable device; and in response to determining that the build unit is not physically connected to the host apparatus, control the controllable device according to a second operating mode in which the controllable device is controlled according to second control instructions generated in the build unit when the build unit is not physically connected to the host apparatus, wherein a second switch of the control circuit being closed in the second operating mode allows communication of the second control instructions from the processor to the controllable device.

17. The non-transitory computer-readable storage medium of claim 16, wherein the second control instructions are generated in response to a user input received via a user interface of the build unit.

18. The non-transitory computer-readable storage medium of claim 16, wherein the determining is based on an output of a sensor in the build unit.

* * * * *